United States Patent Office 3,280,445
Patented Oct. 25, 1966

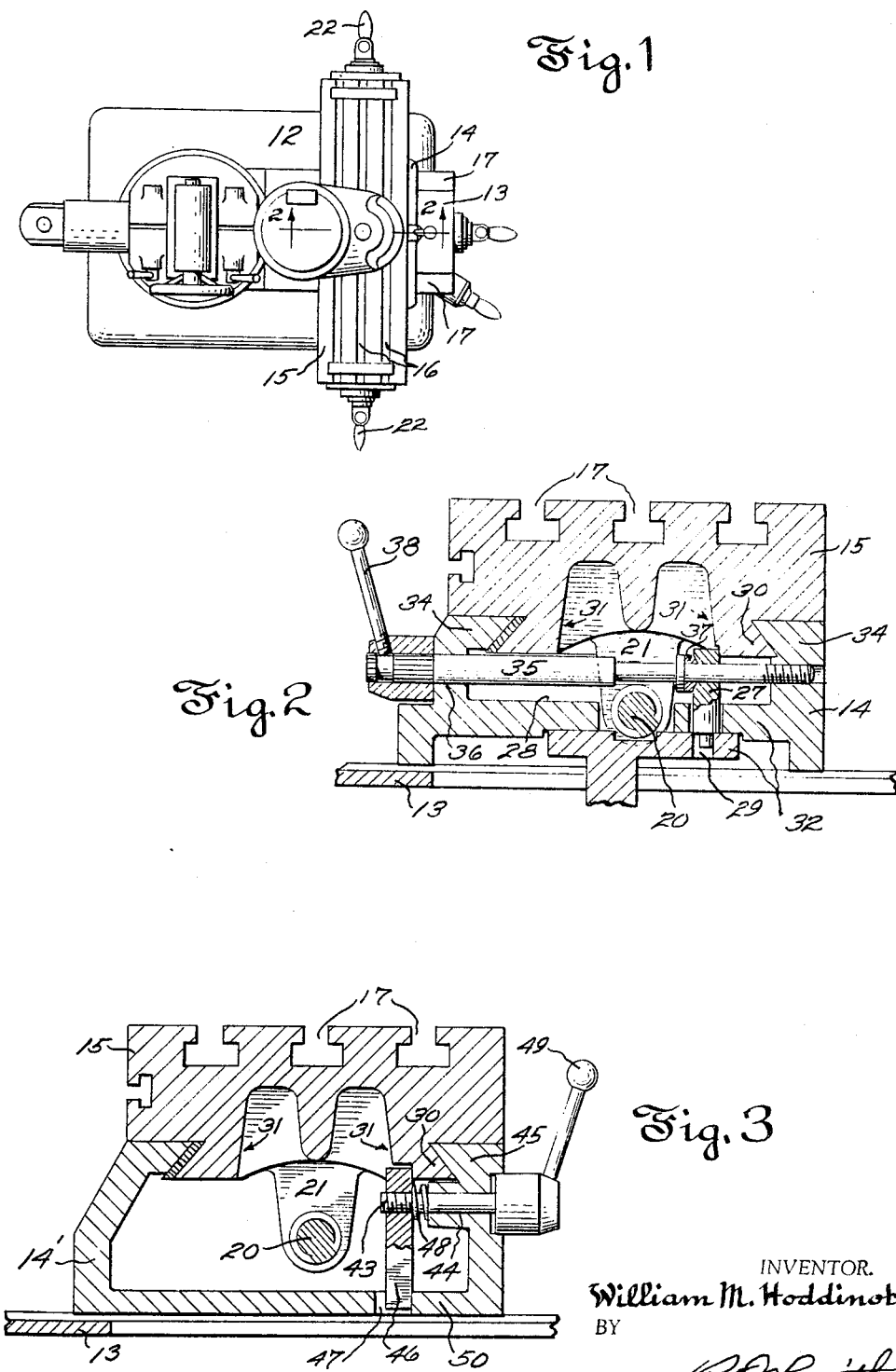

3,280,445
UNDISTORTIVE SLIDE STAYING MECHANISM
William M. Hoddinott, Milford, Conn., assignor to The Bridgeport Machines, Inc., Bridgeport, Conn., a corporation of Connecticut
Filed Aug. 12, 1964, Ser. No. 389,033
2 Claims. (Cl. 29—1)

This invention relates to devices for staying a slidable machine member that is adjustable to different positions along supporting ways particularly of the tongue-and-groove type. The present improvements are particularly applicable to the conventional work carrying table of a milling machine and may be incorporated in other relatively slidable members of a machine tool.

Constructions have been proposed heretofore for staying or locking together relatively slidable machine members having tongue and groove engagement sometimes by drawing toward each other the side walls that border and define the groove or channel in one member that is tracked by a tongue on the other member. The side walls of the groove are thereby squeezed laterally inward against the tongue so as to cause a binding action. An example of that kind of stay clamp appears in United States Patent No. 1,972,828 granted September 4, 1934, to Lester F. Nenninger.

In other instances it has been proposed to forcibly spring apart the branches of a bifurcate guide tongue that project from one slidable machine member into occupancy of a common guide groove in the other member thus to spread such branches into frictional gripping contact with relatively rigid external walls of the guide groove. An example of such construction is disclosed in United States Patent No. 2,831,237, granted April 22, 1958, to Rudolph F. Bannow.

Either of these proposed expedients for staying slidable machine members may set up sufficient stress in the main body of either the tongue carrying member or the groove containing member to cause bodily distortion of the member to a degree that interferes with accurate functioning of associated parts of the machine. Such distortion may also result in errors in the accuracy with which the work can be machined.

An object of the present improvements is to draw and frictionally bind together only one branch of a bifurcate guide tongue and only one side wall of its guide groove so as to avoid harmful stress and strains in the bodies of relatively slidable machine members regardless of how forcibly the tongue and groove bordering wall are drawn together to produce a frictional hold.

Another object is to make use of a tiltable, loose thrust block stationed in relation to one of the relatively slidable members for transmitting the pressure that is brought to bear between directly contacting surfaces of only one branch of a bifurcate guide tongue and only one wall of its guide groove.

These and other objects of the invention will appear in greater particular from the following description of successful embodiments of the improvements having reference to the appended drawings wherein:

FIG. 1 is a plan view of a milling machine having a conventional slidable work carrying table to which the present improvement may be applied.

FIG. 2 is a fragmentary view on an enlarged scale taken in section on the plane 2—2 in FIG. 1 showing one embodiment of the invention.

FIG. 3 shows a modification of the clamping construction in FIG. 2 embodying a related form of the invention.

In FIG. 1 conventional parts of a milling machine are represented as the base 12, knee 13, saddle 14 and slidable work table 15 having T-slots 16 to accommodate the heads of strap bolts (not shown) for fastening work pieces on the surface of the table. In conventional manner the work carrying table 15 can be fed lengthwise (crosswise the saddle 14) on ways 17 of the saddle by a feed screw 20 which is journaled at its ends in rotary bearings (not shown) stationed on the saddle 14. Feed screw 20 has screw threaded engagement with a follower lug 21 depending fixedly from the table 15 and is provided with endwise axial thrust at each of its ends against the saddle 14. Thus table 15 can be caused to slide endwise along the feed screw when the latter is turned by either of crank handles 22 that are stationed in fixed relation to the saddle 14 at either side thereof so as to be manually accessible at either end of the work table.

To prevent any play that might arise from backlash between the threads of feed screw 20 and its follower lug 21, or from other looseness in the table feeding mechanism, improved means are afforded by this invention for positively staying the table 15 against sliding movement. Such means in FIG. 2 comprises a tiltable clamping or pressure block 27 stationed in a fixed location within the guide groove or channel 28 in the saddle 14. Block 27 has its bottom end loosely anchored in an oversize aperture or socket 29 in a cross wall 32 of the saddle structure.

The top end of block 27 bears outward of the channel 28 toward the right against the inner surface of only one branch 30 of the bifurcated, downward projecting guide tongue 31 which is of dovetail shape and depends fixedly from the worktable, extending continuously therealong. The guide groove or channel 28 that is tracked by the table tongue 31 is also of dovetail shape and is bordered by a rigid upstanding wall 34 of the saddle 14 having an exposed outer lateral surface and an inner lateral surface directed toward the channel.

The space between block 27 and wall 34 that underlies the tongue branch 30 is spanned by a draw bolt 35 which extends into screw threaded engagement with the guide wall 34 on the saddle. Bolt 35 traverses the whole width of the guide groove 28 and extends through a clearance hole 36 in the other bordering wall 34 of the guide groove. Bolt 35 fixedly carries a collar 37 of hard metal presenting a crowned thrust surface into pressure contact with a correspondingly shaped depression in the adjacent face of block 27.

When bolt 35 is tightened by means of its outboard handle 38, block 27 is caused to clamp only one branch 30 of the bifurcate guide tongue 31 against only one wall 34 of the guide groove. As tongue branch 30 and wall 34 are in direct surface contact no stresses are imposed in the main body of either of the slidable members 14 or 15.

In the modified construction shown in FIG. 3, the modified draw bolt 43 is shortened to extend only through a clearance hole 44 in the bodering wall 45 of guide groove 28 and into screw threaded engagement with the modified clamp block 46. Like block 27 in FIG. 2 block 46 has its bottom end loosely anchored in an aperture 47 in the cross wall 50 of the modified frame work of saddle 14′. An axially expansive coiled spring 48 constantly biases block 46 to separate from the groove bordering wall 45. Upon tightening of bolt 43 by turning its outboard handle 49, block 46 is caused to draw the top end of the block toward wall 45 and thus clamp only one branch 30 of the bifurcate guide tongue 31 tightly against only one wall 45 that borders the guide groove.

In each of the constructions in FIGS. 2 and 3 the block 27 or 46 is prevented from swinging with the turning of the draw bolt by the anchorage of its bottom end in the aperture 29 or 47.

What is claimed is:

1. Distortion preventing slide staying mechanism comprising in combination with a slidable machine member and a supporting member, spaced apart side walls on said supporting member flanking a guide channel therebetween, one of said walls having an exposed outer lateral surface and an inner lateral surface directed toward said channel, a bifurcate guide tongue on said slidable member having spaced apart branches occupying said channel, one of said branches having a lateral inner surface exposed to said channel and a surface directed outward of said channel slidably fitting said inner lateral surface of said side wall, a pressure block positioned in said channel to bear in an outward direction on said inner surface of said tongue branch, and a draw bolt having a head manually accessible outside of said members bearing against said outer lateral surface of said side wall and extending through one of said side walls into operative engagement with said pressure block within said channel thereby to cause said pressure block to clamp only one of said tongue branches against only one of said side walls without transmission of stress to other portions of said machine member or supporting member.

2. Distortion preventing slide staying mechanism as defined in claim 1, in which the said supporting member has an aperture opening into the said channel, and the said pressure block has one end thereof tiltably anchored in said aperture.

References Cited by the Examiner
UNITED STATES PATENTS 2,685,727   8/1954   Walter _____ 29—1.5

RICHARD H. EANES, JR., *Primary Examiner.*